United States Patent [19]

Sakai

[11] Patent Number: 5,284,398
[45] Date of Patent: Feb. 8, 1994

[54] PILLOW BALL JOINT AND METHOD OF MAKING THE JOINT

[75] Inventor: Motohiro Sakai, Aichi, Japan

[73] Assignee: TRW Steering & Industrial Products (Japan) Co., Ltd., Minato, Japan

[21] Appl. No.: 837,063

[22] Filed: Feb. 18, 1992

[30] Foreign Application Priority Data

Mar. 19, 1991 [JP] Japan ................................. 3-54889

[51] Int. Cl.$^5$ ............................................. F16C 11/10
[52] U.S. Cl. ................................... 403/135; 403/131; 403/274; 403/284; 29/898.043; 29/898.044
[58] Field of Search ............... 403/135, 134, 140, 122, 403/131, 136, 132, 138, 76, 274, 284; 29/898.043, 898.044

[56] References Cited

U.S. PATENT DOCUMENTS

| | | | |
|---|---|---|---|
| 3,351,999 | 11/1967 | McCloskey | 384/203 X |
| 4,714,368 | 12/1987 | Sawada et al. | 403/140 X |
| 4,880,329 | 11/1989 | Sakai | 403/134 |
| 5,078,531 | 1/1992 | Sakai et al. | 403/140 |

FOREIGN PATENT DOCUMENTS

| | | |
|---|---|---|
| 64-6512 | 1/1989 | Japan . |
| 116315 | 5/1989 | Japan .................................. 403/135 |
| 126415 | 5/1989 | Japan .................................. 423/132 |
| 195013 | 8/1990 | Japan .................................. 403/134 |

*Primary Examiner*—Peter M. Cuomo
*Assistant Examiner*—Harry C. Kim
*Attorney, Agent, or Firm*—Tarolli, Sundheim & Covell

[57] ABSTRACT

A joint comprising a pillow ball having a spherical portion, a bearing for rotatably supporting the spherical portion, and a housing for housing the bearing. The housing has therein a housing bore having a first step for contacting one end of the bearing, a large bore contiguous to the housing bore via a second step, and an attaching bore contiguous to the large bore for receiving a dustproof covering. The depth of the first step is substantially equal to the axial length of the bearing. The joint further comprises an annular plug inserted into the large bore. The annular plug has a taper tapering off toward the side opposite to the housing bore, and the annular plug is pressed and secured onto the second step by caulking or deforming the inside of the housing to fit the taper. The annular plug and the bearing are thus prevented from coming out of the large bore and the housing bore, respectively. The composing members of the joint are simple in their structure and can be easily manufactured and assembled. After the joint is inserted into a mounting hole in a link mechanism, the caulked periphery of the housing is protected from the outside, thus enhancing the corrosion resistance of the joint.

20 Claims, 2 Drawing Sheets

PILLOW BALL JOINT AND METHOD OF MAKING THE JOINT

BACKGROUND OF THE INVENTION

This invention relates to a joint for rotatably connecting a vehicle suspension arm or other link mechanism.

Conventionally, in a joint a snap ring is attached to a groove formed in a mounting hole of a housing so as to prevent a bearing from coming out of the mounting hole in the housing. However, the gap interposed between the snap ring and the groove causes backlashes while the gap in the snap ring impairs the rigidity of the joint. Furthermore, the groove must be so narrow for holding the snap ring that the groove is difficult to form in the mounting hole of the housing, thus increasing the manufacturing costs.

To solve this problem Japanese Laid-open Patent Application No. S64-6512 proposes a joint comprising a plug engaged in a groove. The plug comprises an annular portion and a cylindrical portion. The end of the annular portion contacts the end of a bearing, and the cylindrical portion extends diametrically outward from the outer peripheral edge of the annular portion and stands along the axis of the housing. This prior art proposes another joint, in which the plug is first engaged in a stepped bore and the end of the cylindrical portion of the plug is then caulked, thus preventing the bearing from inadvertently disengaging from the mounting hole in the housing.

In this prior art the inner periphery of the housing still requires the groove for receiving the plug, and the problem is that such groove is difficult to form and manufacture. In another joint of the prior art, after the plug is engaged in the stepped bore, the end of the cylindrical portion is caulked, so that the bearing is securely held in the housing. If a galvanizing process or other surface treatment precedes the caulking process, the galvanized plate on the caulked portion would peel off, thus deteriorating the corrosion resistance of the joint. Therefore, the caulking process needs to precede the surface treatment. If the caulked portion of the plug is pressured to fit the joint onto the link mechanism, the caulked portion may not be able to resist the pressure directed thereto because of its thinness, thus decreasing the strength of the joint. The joint must be carefully assembled into the link mechanism so that the caulked portion of the plug can resist the pressure required for such assembling.

SUMMARY OF THE INVENTION

Wherefore, an object of this invention is to provide a joint that can be manufactured by simplified processes and is composed of members which are simple in structure.

Other objects and benefits of the invention will become apparent from the detailed description which follows hereinafter when taken in conjunction with the drawing figures which accompany it.

To solve this and other objects, this invention provides a joint comprising a pillow ball having an exterior spherical portion; a bearing surrounding the spherical portion of the pillow ball and having an inner surface matingly engaging the spherical portion and allowing at least rotation of the spherical portion relative to the bearing; a housing, containing the bearing, having an aperture containing a first attaching bore, an intermediate bore and a housing bore sequentially arranged therein, the first attaching bore being located adjacent a first end of the aperture and being dimensioned to receive a dustproof cover, the attaching bore being contiguous with the intermediate bore, the intermediate bore being contiguous with the housing bore and being separated therefrom via a second shoulder, and a first bearing engaging shoulder being provided adjacent a portion of the housing bore remote from the first end; and an annular plug member, sized to be received within the intermediate bore and retain the bearing in the housing bore, having a conical exterior surface, the annular plug member being inserted into the intermediate bore, after insertion of the bearing and pillow ball, and engaging the second shoulder with the tapered end of the annular plug member being located remote from the housing bore, and the annular plug member being pressed against and secured to the second shoulder by inward deformation of the intermediate bore housing wall so that an inner surface of the housing engages at least a portion of the conical exterior surface of the annular plug member to retain the annular plug member, the bearing and the pillow ball in the housing bore.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
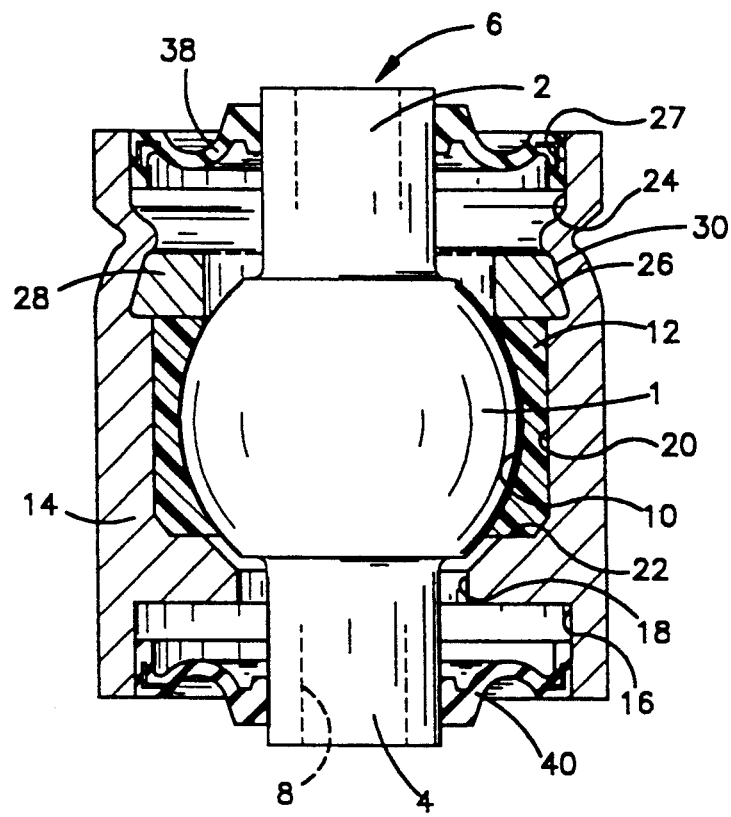
FIG. 1 is a cross-sectional view of a joint embodying the invention.

As shown in FIG. 1, a joint is provided with a pillow ball 6, and the pillow ball 6 has a spherical portion 1 and axial portions 2 and 4 extending straight along the same axis from both opposed ends of the spherical portion 1. The pillow ball 6 also has a central hole 8 extending axially therethrough.

The joint is also provided with a bearing 12 which has a concave surface 10 for surrounding the periphery of the spherical portion 1. The concave surface 10 is complementary in its configuration to the outer periphery of the spherical portion 1. The bearing 12 can be formed of bearing metal, sintered metal containing oil, synthetic resin or another similar material. In this embodiment, the periphery of the spherical portion 1 is spherically in contact with the concave surface 10 of the bearing 12, the spherical portion 1 can rotate around the axis of the axial portions 2 and 4, and rotary motion of the axial portions 2 and 4 is permitted. Also in this embodiment, the bearing 12 is composed of two axially divided halves.

Figure 2:
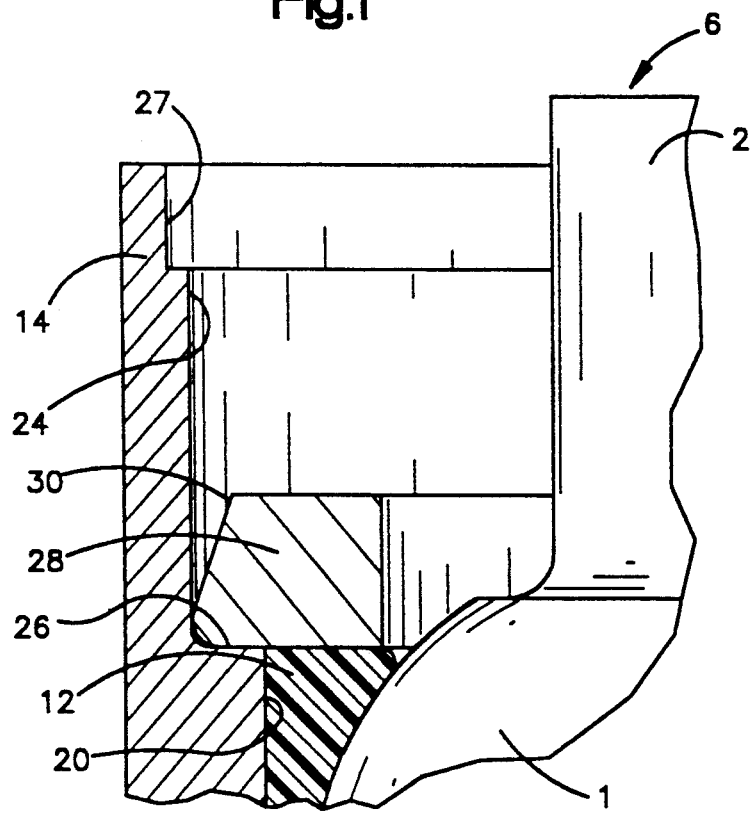
FIG. 2 is an enlarged partial cross-sectional view of a large bore and an annular plug inserted in the large bore before caulking.

The bearing 12 is held in a housing 14 having a circular cross-sectional outline or contour. In the housing 14, a second attaching bore 16, a small bore 18 and a housing bore 20 are made in that order from one end of the housing 14. A first shoulder or step 22 is formed between the small bore 18 and the housing bore 20. The housing bore 20 is contiguous with a large or intermediate bore 24 via a second shoulder or step 26, and the depth of the housing bore 20 between the first step 22 and the second step 26 almost equals the axial length of the bearing 12. The large bore 24 is contiguous with one end of a first attaching bore 27, and the other end of the attaching bore 27 opens or communicates with an opening of the other end of the housing 14. As shown in FIG. 2, the large bore 24, which extends parallel to and from the housing bore 20 toward the other end of the housing 14, can be formed easily with a reamer or a press. Subsequently, the attaching bore 27 can be easily formed with a reamer.

Figure 3:
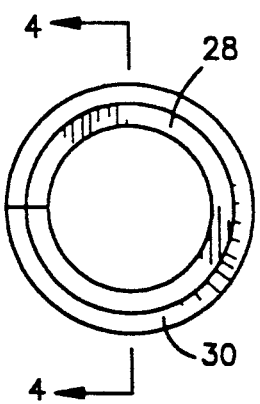
FIG. 3 is a plan view of the annular plug for the embodiment.
Figure 4:
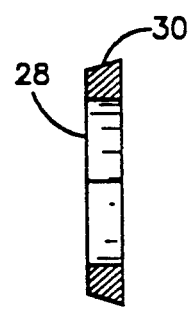
FIG. 4 is a cross-sectional view of the annular plug taken along line 4—4 in FIG. 3.

As shown in FIG. 2, an annular plug 28 having an outer diameter large enough to be inserted into the large bore 24 contacts the second step 26 in the large bore 24. The inner diameter of the annular plug 28 is formed smaller than the outer diameter of the bearing 12 and larger than the lateral cross section of the spherical portion 1 not contained by or jutting out of the bearing 12. A conical surface or taper 30 is formed on the outer periphery of the annular plug 28. The taper 30 tapers toward the side opposite to the housing bore 20 when the annular plug 28 is inserted in the large bore 24. As shown in FIGS. 3 and 4, the annular plug 28 with the taper 30 can be formed by bending a linear material having a trapezoidal cross-section such that a ring is formed with the taper 30 facing outwardly. Being different from the conventional snap ring which has a gap and is inserted in a groove formed in the housing, both ends of the bent linear material can be spaced very closely to each other because the annular plug 28 can be inserted into the large bore 24 without deflecting.

Figure 5:
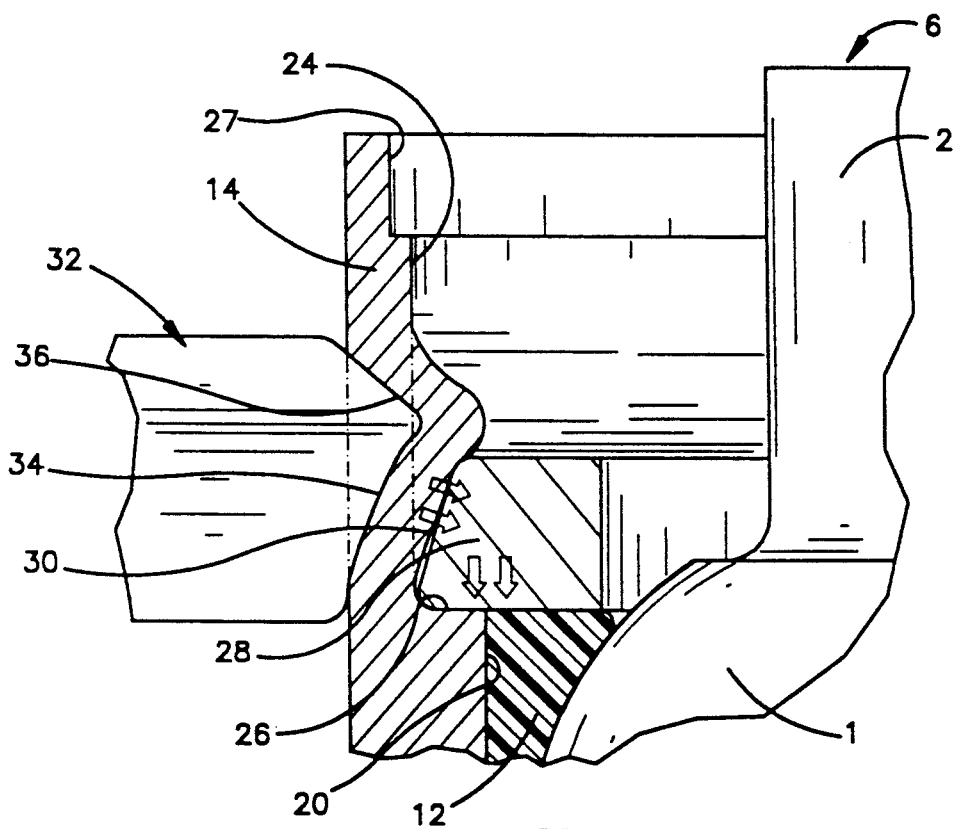
FIG. 5 is an enlarged partial cross-sectional view of the joint during the caulking process.

After the annular plug 28 is inserted into the large bore 24 and contacts the second step 26, the outer periphery of the housing 14 is caulked or deformed with a caulking or deforming roller 32 as shown in FIG. 5. The caulking roller 32 is composed of a sloping portion 34 sloping parallel to the taper 30 and a protrusion 36 connected to the sloping portion 34. The sloping portion 34 is disposed opposite to the taper 30 via the housing 14 when the outer periphery of the housing 14 is caulked. Subsequently, the caulking roller 32 is rotated around the housing 14 while pushing against the outer periphery of the housing 14. The housing 14 is thus deformed toward the inside and pressed against the taper 30 for caulking. When the inner periphery of the housing 14 is pressed against the taper 30, the press force directed toward the taper 30 acts on and biases the second step 30, and the annular plug 28 is pressed against the second step 26. After the caulking process is completed, dustproof coverings 38 and 40 are inserted into the attaching bores 27 and 16, respectively. In this embodiment, the housing 14 is caulked around the periphery thereof with the caulking roller 32, but the periphery of the housing 14 could be partially caulked with a punch or other relevant tool.

The operation of the joint in this embodiment will now be explained. The spherical portion 1 of the pillow ball 6 is rotatably supported in the bearing 12, and the bearing 12 is securely held in the housing bore 20 between the first step 22 and the annular plug 28. Therefore, diametrical movement as well as axial movement of the bearing 12 are prevented in the housing bore 20. The movement of the annular plug 28 is prevented by the second step 26 and the caulked periphery of the housing 14. Since the annular plug 28 is pressed onto or against the second step 26 by caulking the housing 14, the annular plug 28 and also the bearing 12 are securely supported without any axial backlash. When external force is applied onto the pillow ball 6, the force is transmitted via the bearing 12 and the housing 14 to a not-shown link mechanism into which the housing 14 is fitted or secured. According to the direction of the external force applied onto the pillow ball 6, the spherical portion 1 of the pillow ball 6 may rotate about the axis of the axial portions 2 and 4 and may move along the inner periphery of the concave surface 10 in the bearing 12.

As aforementioned, after the annular plug 28 is inserted into the large bore 24, the wall of the large bore 24 is fixedly attached to the outer periphery of the taper 30 by caulking the housing 14. Therefore, the large bore 24 and the annular plug 28 can be manufactured easily without requiring high dimensional or tolerance precision. The annular plug 28 has a simple structure with the taper 30 provided on the outer periphery thereof and can be formed easily by bending the linear material to form a ring. These composing members of the joint are simple in structure and to manufacture. The assembling process is composed of inserting the annular plug 28 into the large bore 24 and caulking the housing 14. The number of the assembling steps are thus decreased, contributing to a reduction in costs.

As aforementioned, after a portion of the outer periphery of the housing 14 approximately corresponding to the axial middle of the wall of the large bore 24 is caulked, the dustproof covering 38 is inserted into the attaching bore 27 over the large bore 24. Therefore, when the joint is inserted by pressure into a mounting hole in the not-shown link mechanism, the caulked periphery is not exposed to the outside, because it is concealed by the attaching bore 27. Therefore, even if galvanizing precedes the caulking process, the corrosion resistance of the joint can be assured because the caulked periphery is not exposed. The annular plug 28 is pressed and securely held against the second step 26 by caulking the housing 14, thus avoiding backlashes and enhancing the rigidity of the joint.

Figure 6:
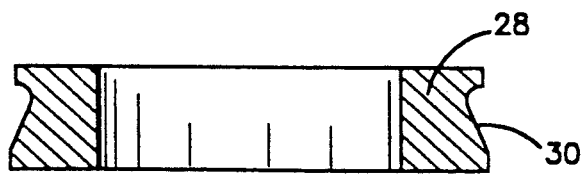
FIG. 6 is an enlarged partial cross-sectional view of an annular plug for another embodiment.

This invention has been described above with reference to a preferred embodiment as shown in the drawings. Modifications and alterations may become apparent to one skilled in the art upon reading and understanding the specification. Despite the use of a single embodiment for illustration purposes, however, it is intended to include all such modifications and alterations within the scope and spirit of the appended claims. For example, as shown in FIG. 6, the taper 30 could be formed on only a part of the outer periphery of the annular plug 28.

Wherefore, having thus described the present invention, what is claimed is:

1. A joint comprising:
 a pillow ball having an exterior spherical portion;
 a bearing surrounding said spherical portion of said pillow ball and having an inner surface matingly engaging said spherical portion and allowing at least rotation of said spherical portion relative to said bearing;
 a housing having an aperture which includes a first attaching bore, an intermediate bore and a housing bore sequentially arranged therein, said attaching bore being located adjacent a first end of said aperture and having a smooth annular inner surface with an inner diameter dimensioned to receive a dustproof cover, said attaching bore being contiguous with said intermediate bore, said intermediate bore having an upper portion adjacent to said attaching bore and a lower portion adjacent to said housing bore, said upper portion having a smooth annular inner surface with an inner diameter, said lower portion having an inner surface with an inner diameter which is less than the diameter of the respective inner surface of said upper portion and said attaching bore, said intermediate bore being contiguous with said housing bore and being separated therefrom via a step shoulder, said housing bore having an inner diameter less than the diameter of each respective inner surface of said upper portion and said attaching bore, said inner surface of said lower portion tapering radially inward from said step shoulder, said bearing being located in said housing bore, and a bearing engaging shoulder located adjacent a portion of said housing bore remote from the first end; and a substantially annular plug member located in said intermediate bore, adjacent said lower portion, for retaining said bearing in said housing bore, said plug member having a planar surface engaging said step shoulder and said bearing, said plug member having a conical external surface which radially tapers outward to said planar surface and which engages said tapering inner surface of said lower portion, said plug member being trapped between said step should and said tapering inner surface of said lower portion to prevent movement of said plug member.

2. A joint as set forth in claim 1, wherein said housing bore has a depth substantially equal to the axial length of said bearing.

3. A joint as set forth in claim 1, including a dustproof cover located in said attaching bore, said dustproof cover has an outer surface engaging said smooth inner surface of said attaching bore for preventing foreign matter from passing between said outer surface of said dustproof cover and said smooth inner surface of said attaching bore.

4. A joint as set forth in claim 1, wherein the aperture extends completely through said housing and a second end of said aperture is provided with a second attaching bore and said second attaching bore communicates with a portion of said housing bore, adjacent said bearing engaging shoulder, via a small bore, and said pillow ball further includes a pair of first and second opposed axial portions, each said axial portion has a first end attached to said pillow ball and a second end thereof extending axially from said pillow ball along a longitudinal axis thereof through said first and second ends of said aperture, respectively, 5. A joint as set forth in claim 4, including dustproof covers located in each of said first and second attaching bores, respectively, said dustproof cover being located in said first attaching bore having an outer surface engaging said smooth inner surface of said attaching bore for preventing foreign matter from passing between said outer surface of said dustproof cover located in said first attaching bore and said smooth inner surface of said first attaching bore.

6. A joint as set forth in claim 4, wherein a central hole extends axially through said first and second axial portions and said spherical portion of said pillow ball.

7. A joint as set forth in claim 1, wherein said bearing is formed of one of bearing metal, sintered metal containing oil and synthetic resin.

8. A joint as set forth in claim 1, wherein said plug member has a ring-shape having a substantially trapezoidal transverse cross-section.

9. A joint as set forth in claim 1, wherein said plug member has a single discontinuity along its circumferential extent.

10. A joint as set forth in claim 1, wherein said plug member has an opening with an inner diameter smaller than an outer diameter of said bearing so as to retain said bearing in said housing bore.

11. A joint as set forth in claim 10, wherein the inner diameter of said opening of said plug member is larger than a lateral cross-section of a portion of said pillow ball which extends out of said bearing so as to facilitate rotation of said pillow ball.

12. A joint as set forth in claim 1, wherein said bearing has a concave surface which surrounds and mates with said exterior spherical portion of said pillow ball.

13. A joint as set forth in claim 1, wherein said pillow ball further comprises first and second axial portions extending axially along a longitudinal axis of said pillow ball from opposite sides thereof.

14. A method of making a joint comprising pillow ball having an exterior spherical portion, a bearing surrounding the spherical portion of the pillow ball and having an inner surface matingly engaging the spherical portion and allowing at least rotation of the spherical portion relative to the bearing, a housing defining an aperture which includes a first attaching bore, an intermediate bore and a housing bore each defined by a respective housing portion and being sequentially arranged therein, the first attaching bore being located adjacent a first end of the aperture and being dimensioned to receive a dustproof cover, the attaching bore being contiguous with the intermediate bore, the intermediate bore being contiguous with the housing bore and being separated therefrom via a step shoulder, the bearing being located in the housing bore, a bearing engaging shoulder being provided adjacent a portion of the housing bore remote from the first end, and an annular plug member, sized to be received with in the intermediate bore and retain the bearing in the housing bore, having a conical exterior surface, said method comprising the steps of:

inserting the bearing and pillow ball into the housing bore;

subsequently inserting the plug member into the intermediate bore so that the plug member engages the step shoulder with the tapered end of the plug member being located remote from the housing bore; and subsequently inwardly deforming the housing portion defining the intermediate bore to form an upper portion of the intermediate bore adjacent to said first attaching bore and a lower portion of the intermediate bore adjacent to said housing bore, said upper portion having a smooth annular inner surface with an inner diameter, said lower portion having an inner surface with an inner diameter which is less than the diameter of the respective inner surface of said upper portion and said attaching bore while retaining the housing portion defining the first attaching bore in an undeformed state so that an inner surface of said housing portion defining the intermediate bore engages at least a portion of the conical exterior surface of the plug member and biases the plug member against the step shoulder to retain the plug member within the intermediate bore and the bearing within the housing bore.

15. A method of making a joint as set forth in claim 14, including the step of forming the housing bore with a depth substantially equal to an axial length of said bearing.

16. A method of making a joint as set forth in claim 14, including the step of bending a linear material having a substantial trapezoidal transverse cross-section into a circular configuration to form the plug member.

17. A method of making a joint as set forth in claim 14, said step of inwardly deforming the housing portion defining the intermediate bore includes deforming the housing between said portions defining the first attaching bore and the housing bore with a roller having a sloped portion arranged parallel with the taper of the plug member so that the housing, when deformed, presses the plug member against the step shoulder and prevents axial movement of the bearing.

18. A method of making a joint as set forth in claim 14, including the steps of forming the aperture to extend completely through the housing and providing a second end of the aperture with a second attaching bore, the second attaching bore communicating with a portion of the housing bore, adjacent the bearing engaging shoulder, via a small bore, and providing the pillow ball with a pair of first and second opposed axial portions, each of the axial portions having a first end attached to the pillow ball and a second end thereof extending axially from the pillow ball along a longitudinal axis thereof through the first and second ends of the aperture, respectively.

19. A method of making a joint as set forth in claim 18, including the step of providing dustproof covering in each of said first and second attaching bores.

20. A method of making a joint as set forth in claim 14, including forming the housing prior to inserting the bearing and pillow ball into the housing, said step of forming the housing including forming the attaching bore with an inner diameter dimensioned to receive the dustproof cover, forming the intermediate bore with an inner diameter dimensioned to receive the annular plug member and forming the housing bore with an inner diameter less than the respective diameters of the attaching bore and the intermediate bore, said step of deforming the housing portion defining the intermediate bore includes displacing an annular surface segment of the housing portion defining the intermediate bore radially inward to reduce the diameter of the surface segment such that the diameter of the surface segment is less than the diameter of the attaching bore.

* * * * *